United States Patent [19]
Landers et al.

[11] Patent Number: 5,353,854
[45] Date of Patent: Oct. 11, 1994

[54] PNEUMATIC TIRE HAVING LATERALLY CONNECTED LUGS

[75] Inventors: Samuel P. Landers, Uniontown; William E. Glover, Akron; John S. Attinello, Hartville, all of Ohio

[73] Assignee: The Goodyear Tire & Rubber Company, Akron, Ohio

[21] Appl. No.: 666,327

[22] Filed: Mar. 8, 1991

[51] Int. Cl.5 .............................................. B60C 11/11
[52] U.S. Cl. ........................... 152/209 R; 152/DIG. 3
[58] Field of Search ........... 152/209 R, 209 B, 209 D, 152/DIG. 3; D12/146–149, 151

[56] References Cited

U.S. PATENT DOCUMENTS

| | | | |
|---|---|---|---|
| D. 92,050 | 4/1934 | Vidale | D12/148 |
| D. 283,499 | 4/1986 | Hammond | D12/146 |
| D. 283,500 | 4/1986 | Graas et al. | |
| 1,452,099 | 4/1923 | Sipe | 152/209 R |
| 3,939,890 | 2/1976 | Abe | 152/209 B |
| 4,057,089 | 11/1977 | Johannsen | |
| 4,078,596 | 3/1978 | Nakayama et al. | 152/DIG. 3 |
| 4,470,443 | 9/1984 | Eraud | |
| 4,474,223 | 10/1984 | Landers | |
| 4,667,717 | 5/1987 | Graas | |
| 4,687,037 | 8/1987 | Pfeiffer et al. | |
| 4,700,762 | 10/1987 | Landers | 152/209 R |
| 4,722,378 | 2/1988 | Carolla et al. | |
| 4,730,654 | 3/1988 | Yamashita et al. | |
| 4,765,384 | 8/1988 | Rohde | |
| 4,913,208 | 4/1990 | Anderson et al. | |
| 4,962,801 | 10/1990 | Tsuda | 152/209 R |
| 4,962,801 | 10/1990 | Tsuda | |
| 5,000,239 | 3/1991 | Brayer et al. | 152/209 R |
| 5,047,483 | 9/1991 | Halasa et al. | 152/540 |

FOREIGN PATENT DOCUMENTS

| | | |
|---|---|---|
| 0296605 | 6/1988 | European Pat. Off. |
| 3624408 | 2/1988 | Fed. Rep. of Germany |
| 3723368 | 3/1989 | Fed. Rep. of Germany |
| 3901624 | 8/1989 | Fed. Rep. of Germany |
| 0100503 | 2/1978 | Japan ............................ 152/209 R |
| 0137003 | 6/1988 | Japan ............................ 152/209 R |
| 0022601 | 1/1989 | Japan ............................ 152/209 R |
| 1499365 | 2/1978 | United Kingdom |
| 2166095 | 4/1986 | United Kingdom |

OTHER PUBLICATIONS

Stile Industria, p. 23, top right picture, Dec. 1956.
"Pneumatic Tyre Design" by E. C. Woods 1952; p. 24.

*Primary Examiner*—Michael Ball
*Assistant Examiner*—Nancy T. Krawczyk
*Attorney, Agent, or Firm*—David E. Wheeler

[57] ABSTRACT

A directional pneumatic tire having improved wet traction is provided. The tread is divided into two annular portions, each annular portion comprising a plurality of block elements separated by lateral grooves. The block elements extend continuously from a shoulder area of the tire to a mid portion of the tread. The block elements have substantially circumferentially aligned notches in leading and trailing groove walls, wherein each notch is defined laterally by a narrow bridge of rubber. The tread has curved lateral grooves to direct water from the footprint to the shoulder area of the tire to help prevent hydroplaning. The pitch boundaries between annular portions of block elements may be skewed. The curved lateral grooves and the skewing reduce noise properties of the tire.

18 Claims, 5 Drawing Sheets

PNEUMATIC TIRE HAVING LATERALLY CONNECTED LUGS

BACKGROUND OF THE INVENTION

The invention relates to pneumatic tires which have improved wet traction and handling characteristics as well as improved noise and irregular wear characteristics.

This application is somewhat related to copending applications U.S. Ser. Nos. 07/666,816; 07/666,811; D667,100; 07/666,329; 07/666,328; and 07/666,815 incorporated herein by reference, and filed on even date herewith.

Irregular wear has become a problem in tires in recent years due mainly to the expanding use of front wheel drive and the use of new suspension systems and braking systems. Design changes directed toward the irregular wear problem and wet traction problems have sometimes caused handling problems and tire noise problems.

Hydroplaning of tires on wet pavement has long been a problem in the prior art. Various tire designs, adapted to channel water away from the tire, and thereby maintain rubber contact with the road have been tried by the prior art to correct this problem. Although prior art rain tire designs have improved wet traction, it is a continuing goal in the art to further improve wet traction.

It is an object of the present invention to provide a pneumatic tire having improved wet traction while having good handling, improved noise and improved irregular wear characteristics.

Other objects of the invention will be apparent from the following description and claims.

Definitions

"Aqua Channel" refers to an extra wide circumferential groove with angled (non parallel), rounded groove walls designed specifically to channel water out of the footprint of the tire.

"Aspect Ratio" of the tire means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Crown" refers to the circumferentially outermost portion of the carcass substantially within the width limits of the tread.

"Design rim" means a rim having a specified configuration and width.

"Directional tread" refers to a tread design which has a preferred direction of rotation in the forward direction of travel.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner Grooves ordinarily remain open in the tire footprint. Circumferentially and laterally extending grooves sometimes have common portions and may be subclassified as "wide" or "narrow". Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Sipes" refer to small slots molded into ribs of tire that subdivides the tread surface and improves traction characteristics. Sipes tend to close completely in a tire footprint.

"Slots" are elongated void areas formed by steel blades inserted into a cast or machined mold or tread ring. Slots ordinarily remain open in a tire footprint. In the appended drawings, slots are illustrated by single lines because they are so narrow.

"Logarithmic spiral" refers to a spiral that has a gradually expanding arc, as opposed to a substantially constant arc as in for example an Archemedic spiral (i.e. as seen in a phonograph record).

"Lugs" refer to discontinuous radial rows of tread rubber in direct contact with the road surface.

"Normal load and inflation pressure" refers to the specific design inflation pressure and load assigned by the appropriate standards organization for the design rim and service condition for a tire of specific size. Examples of standards are the Tire and Rim Association Manual and the European Tire and Rim Technical Organization.

"Open angle" refers to a groove wall angle which causes the groove to be wider at the top as compared to its width at the tread base.

"Pitch" refers to the circumferential distance from one design feature in the tread pattern to the next similar design feature.

"Pitch boundary" refers to a substantially lateral line in the circumference of the tire that defines the beginning or end of the pitch. The pitch boundary may sometimes be defined by the center of a lateral groove. A pitch boundary "shift" refers to a circumferential displacement of the line.

"Radial" and "radially" are used to mean directions radially toward or away from the axis of rotation of the tire.

"Shoulder" refers to the upper portion of sidewall just below the tread edge.

"Sidewall" means that portion of a tire between the tread and the bead.

"Tie-Bar" refers to an extra thickness of rubber at the bottom of a slot such that, in the locations where the extra rubber is present, the slot depth is less than the slot depth at all other locations. Tie-bars stabilize a lug by limiting the independent movement of two portions of a lug that are separated by slots, while traction properties that are inherent in the use of slots are provided.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

SUMMARY OF THE INVENTION

A pneumatic tire for use on paved surfaces having a net-to-gross ratio of 50% to 80% and an aspect ratio of 0.35 to 0.80 is provided. The tire tread is divided into at least two annular portions, each annular portion having a plurality of block elements separated by lateral grooves. Each block element is continuous in its own annular portion of the tire and has substantially circumferentially aligned notches in leading and trailing groove walls, each of which is defined laterally by a narrow bridge of rubber and the circumferential notches and lateral grooves define lugs. Slots containing tie bars are present in each lug from the shoulder of the tire to its midportion, and the slots and the narrow bridges of rubber permit limited independent movement of the lugs.

In the illustrated embodiment, the tire has conventional construction and comprises a pair of annular beads, carcass plies wrapped around the annular beads, the tread disposed over the carcass plies in a crown area of the tire and sidewalls disposed between the tread and beads. The tread is directional and has a net-to-gross ratio of 50% to 70% and an annular aqua channel having a width of about 10% to 20% of the total treadwidth based on the footprint of the tire.

DETAILED DESCRIPTION OF THE INVENTION

Figure 1:
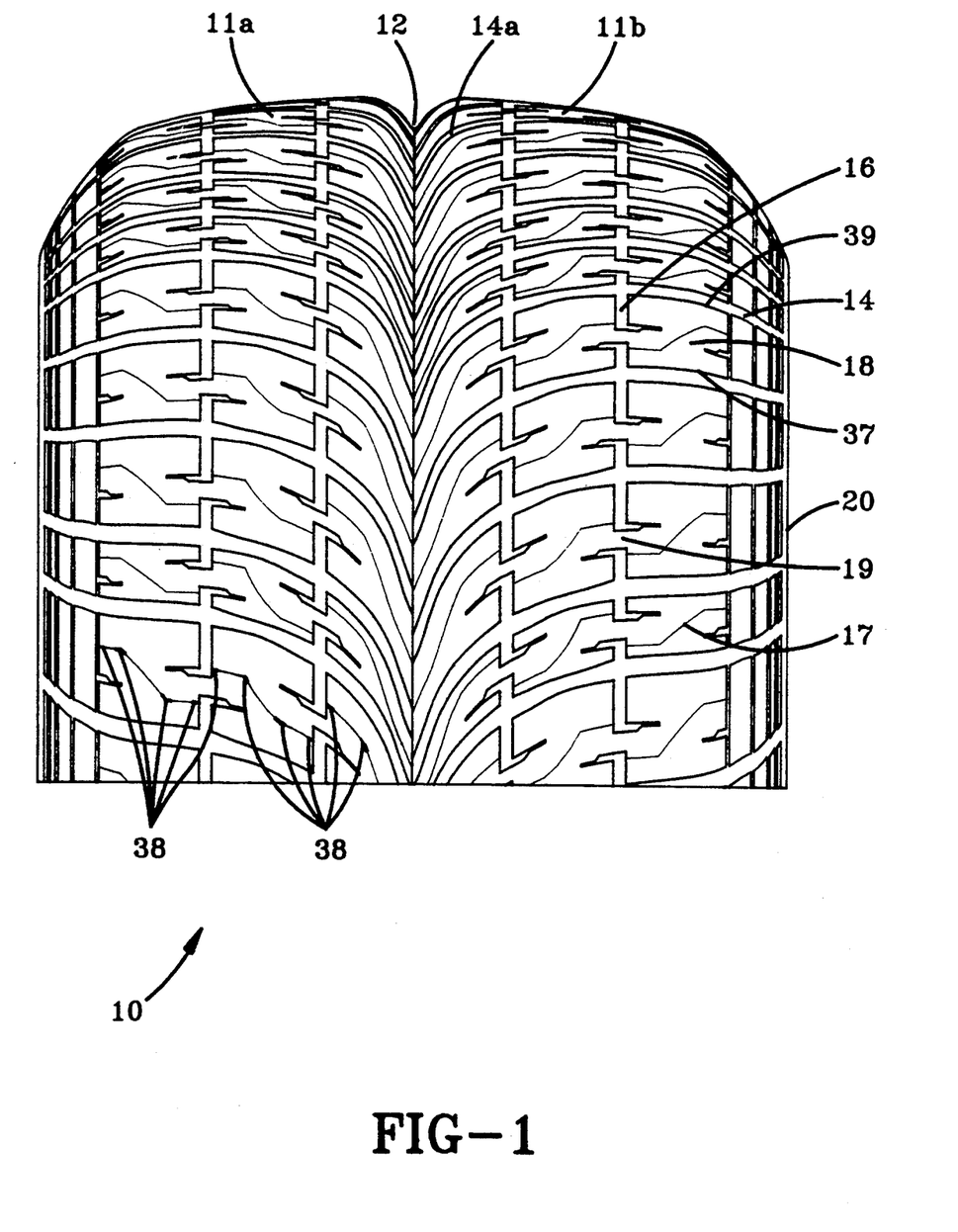
FIG. 1 illustrates a portion of a tire of the invention.

With reference now to FIG. 1, in the illustrated embodiment tire 10 has a tread portion 11 which is divided into two parts, 11a, 11b by aqua channel 12. Curved lateral grooves 14 initiate in aqua channel 12 and take an uninterrupted arcuate path to shoulder 20. Circumferential notches 16 intersect lateral grooves 14 forming lugs 18.

Those skilled in the art will recognize that a similar tread pattern can be used on a pneumatic tire without employing an aqua channel.

In the embodiment of tire 10, lugs or lug segments 18 between pairs of lateral grooves 14 may be characterized as a single element or block since lug segments 18 are connected to each other by bridges 19. In certain locations, the tread depth of the slots is about 0.53 cm (0.21 in) and are not as deep as the grooves (about 0.79 cm (0.31 in) or greater). The rubber between the bottom of the slot, in these locations, and the tread base are known as tie bars 38. Thus bridge 19 connects the leading portion 37 of one lug with the trailing portion 39 of an adjacent lug, and together with tie bars 38 provide a continuous connection between lugs from the shoulder to the center of the tire.

In the prior art, it has been shown that long lateral lugs are particularly prone to irregular wear, presumably because of the distortion of the lug and the resulting squirm when part of a lug is in a footprint and part of the lug is outside the footprint. In the lug configuration of tire 10, although bridges 19 tie the lugs 18 together into one continuous block, providing lateral stability to the tire, the small amount of rubber employed in bridges 19 and slots 17 allow the lugs limited independent movement as parts of the lug enter or leave the footprint, reducing the amount of squirm and consequent irregular wear. The lateral stability attributed to the bridges provides good handling and cornering properties.

Bridges 19 also substantially eliminate groove wander since they prevent the circumferential notches 16 from locking into longitudinal road grooves.

Bridges 19 also maintain the width of notches 16 in the footprint, assuring the widest possible flow path for the longitudinal grooves. Tie bars 38 and bridges 19 cause each set of lugs between a pair of lateral grooves to act together, stiffening the tread and reducing relative strain of individual lugs.

For basically the same reason that a rubber band hums when it is stretched and released, it is believed that at least some tire noise is caused by the acceleration of the lugs when the lug is released from a footprint and the lug is restored from distortion. Since lugs 18 are tied together and support one another, it is believed that the amount of distortion of the lugs is minimized and that the acceleration of the lug coming out of the footprint is damped, in both cases reducing the noise of the tire.

Each annular portion of the tread has an S-shaped lateral groove 14.

Figure 2:
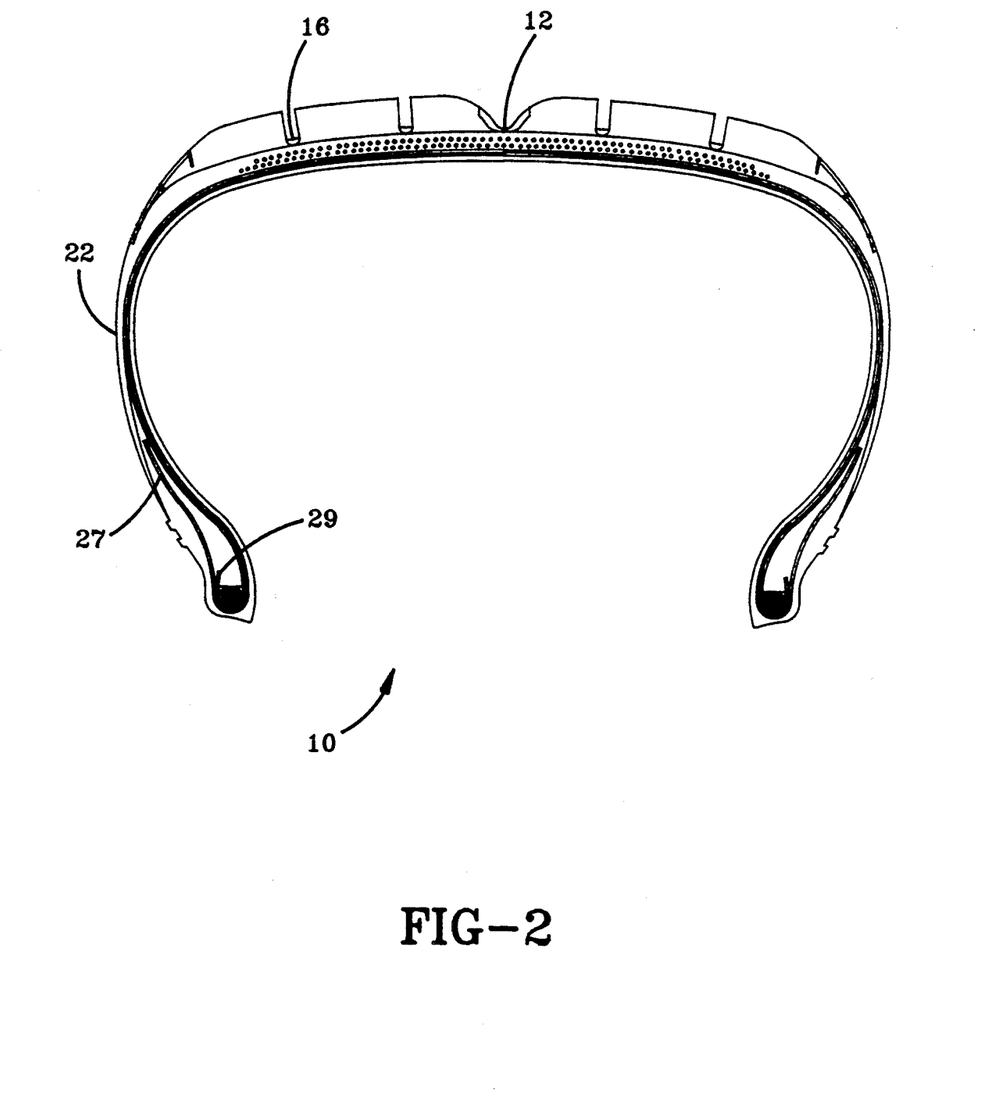
FIG. 2 illustrates a cross section of the tire.

It should be noted that the lugs 18a adjacent to aqua channel 12 are contoured into the aqua channel, forming a part of the aqua channel such that the aqua channel has a curved U shape (having a rounded bottom and curved sides) substantially as shown in FIG. 2, and that the lateral grooves 14 initiate well into the aqua channel.

When driving on wet roads, the presence of the lateral grooves in the aqua channel substantially facilitates the flow of water from the aqua channel into the lateral grooves and out of the footprint of the tire through the shoulder. The curvature of the lateral grooves is such that the center or initial portion 14a of a lateral groove is in the leading edge of the footprint initiating the flow of water before the rest of the lateral groove enters the footprint. As the main portion of the lateral groove 14 enters the footprint, water in lateral groove 14 is expelled through the shoulder area with great force. Accordingly, the tread of the tire of the invention is directional since, if the tire is mounted such that the center portion 14a of the lateral groove enters the footprint last, water would be channeled toward, instead of away from the aqua-channel 12.

In the illustrated embodiments the tread has a designed total net-to-gross ratio of 45% to 70%, preferably 45% to 60%. In the part of the tread that touches the road (i.e. excluding the aqua channel), the tread has a net-to-gross ratio of about 60% to 90%, preferably 68% to 80% and in the illustrated embodiments about 73%. In the illustrated embodiment the overall design net-to-gross ratio is about 55%. It is believed that the high traction properties of the tire, even when the overall net to gross is very low, is partially attributable to the fact that there is a large amount of rubber in contact with the road in the portions of the tire that contact the road.

The design width of aqua channel 12 may comprise about 15–30% of the total tread width based on the tire design. In the illustrated embodiment, the design width of the aqua channel is about 25% of the overall tread width.

In a tire footprint under design load and pressure, the width of the aqua channel is 10%–22%, preferably about 15%, and the overall footprint net to gross is about 50% to 70%, preferably about 55 to 65%. In the illustrated embodiment the footprint net to gross is about 60%. In the contact patch, the part of the tire that touches the road (the footprint excluding the aqua channel), the net-to-gross is about 60%–80% preferably 65% to 75%. In the illustrated embodiment the contact patch net-to-gross is about 70%.

The depth of the aqua channel may comprise 78% to 100%, preferably 82% to 92% of the total tread depth (about 0.91 cm (0.36 in)). By total tread depth it is meant the distance from the tread base to the land area of a lug. In the illustrated embodiment the aqua channel depth is about 83% of the total tread depth or about 0.13 cm (0.05 in) less than the total depth. This depth has been chosen since it insures that the aqua channel will be present throughout the tread life of the tire since the tread wear indicators have a thickness of 0.16 cm (0.06 in).

The tire of the invention may be made to utilize a $\beta$ pitch sequence, an RPAH sequence or any other pitching that is found to be acceptable for a given road surface or purpose.

Pitching as it relates to tires, is well characterized by the prior art as illustrated by U.S. Pat. No. 4,474,223 to Landers and references cited therein.

In the illustrated embodiments each nominal rib of the tire has 61–64 lugs that are divided into random pitch arrangements which contain small, medium, and large pitches. The ratio of pitch sizes may depend on the size of the tire. The ratio of the length of a small pitch to the length of a medium pitch is about 1.1 to 1.23, and the ratio of the length of a small pitch to the length of a large pitch is about 1.2 to 1.53. In the illustrated embodiment a small pitch represents a length of about 22.6 mm, a medium pitch is about 29.1 mm and a large pitch is about 40.1 mm. Because of the curvature of lateral grooves 14, the pitch boundary is curved.

In the embodiment of tire 10, tread portions 11a and 11b are skewed. By skewed it is meant there is a pitch boundary shift between tread portion 11a and tread portion 11b. Because of the pitch boundary shift, the lugs in the two portions of the tire enter into the footprint at different times reducing the amplitudes of the various sound frequencies generated by the tire during its rotation. It is believed that skewing shifts the phase angles of the sound waves generated by the two portions of the tire reducing tire noise by destructive interference and reduction in the amplitudes of the various frequencies at given instants in time. The pitch boundary shift may be approximately a ½ small pitch or a small pitch shift, a ½ medium pitch or a medium pitch shift, a ½ large pitch or a large pitch shift.

In the illustrated embodiment a ½ medium pitch shift is preferred.

The S-shape of the lateral groove extends the lateral groove deep into the shoulder area 20 and causes lateral groove 14 to curve into shoulder 20 at an angle. The curvature of the groove at the shoulder reduces the contact impact of the lugs at the shoulder area as the lug enters the footprint, because of a transitional entering of the lug into the footprint, thereby further reducing the noise of the tire.

With reference now to FIG. 2 the carcass of the tire may comprise at least one high turn up ply 27 and at least one low turn up ply 29 to improve the stiffness of tire sidewall 22.

Figure 3:
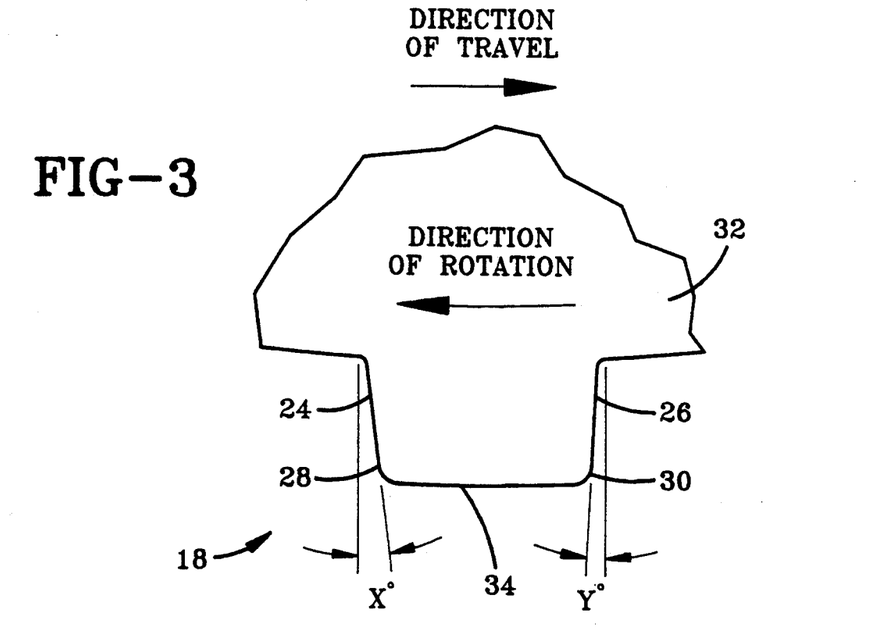
FIG. 3 illustrates a lug of the tire.

With reference now to FIG. 3, in a preferred embodiment lug 18 may be shaped to have a leading edge groove wall 24 having an open angle of 3° to 8°, preferably about 5°, and a trailing edge groove wall 26 having an open angle of 0° to 2°, preferably about 1° Accordingly, the lugs have a trapezoidal shape having a base corresponding to the tread base 32 and a top corresponding to the land area 34 of the lug. The large open angle on the leading edge is believed to improve irregular wear properties because the angle of impact of the lug into the footprint is reduced. The open angle also has a buttressing effect on the lug, stabilizing the leading edge increasing its stiffness. Increased stiffness and a lower angle of impact reduces the amount of energy absorbed by the lug as it enters the footprint, limiting the distortion of the lug, and reducing squirm. Reduced squirm reduces irregular wear.

Also, the wider groove area at the top of the groove may enhance the flow of water out of the footprint.

The smaller angled trailing edge is believed to help maintain braking traction. The smaller angle provides a sharper element edge which keeps water from flowing under the element.

In the illustrated embodiment, because of manufacturing considerations, the trailing groove wall has an angle of 0°.

In addition, to help noise properties, and to enhance irregular wear properties leading edge 28 and trailing edge 30 may be rounded or radiused. In the illustrated embodiment, a radius of 0.15 cm (0.06 in) to 0.25 cm (0.10 in) preferably 0.20 cm (0.08 in) is used. The rounding of the edges is also believed to reduce the effects of squirming by allowing the lug to roll or rotate into the footprint.

It has been discovered that rounding the edges of the lugs also improves the grind appearance of the tire.

Figure 3A:
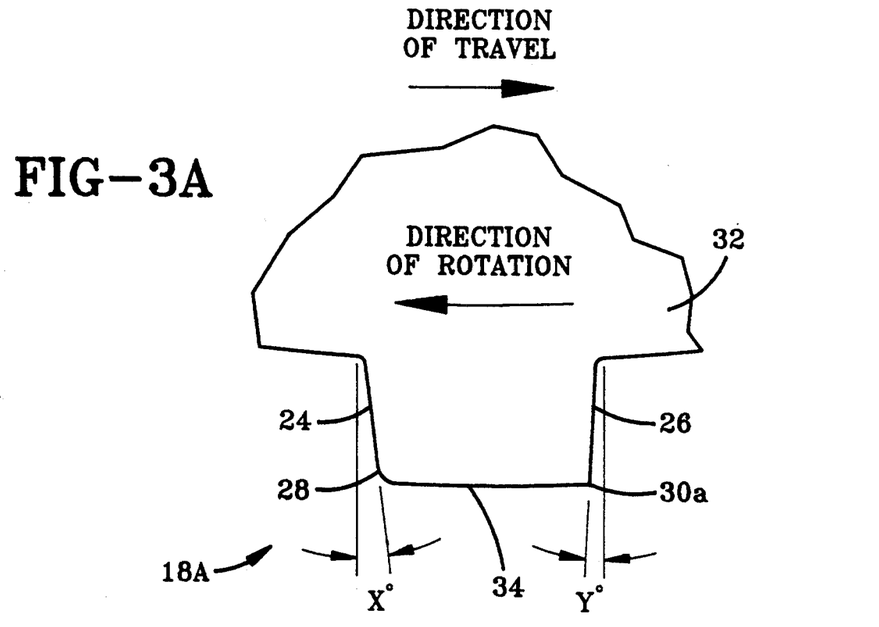
FIG. 3A illustrates an alternative lug of the tire.

FIG. 3A illustrates an alternative embodiment of lug 18A which has a sharp trailing edge 30a. A sharper trailing edge is believed to be advantageous in those applications where enhanced braking traction is desired.

With reference again to FIG. 2, a cross section of the tire illustrates that the depth of aqua channel 12 may be less than 100% of the tread depth. In general it is believed that the aqua channel functions as desired when its depth is 78% to 100% of the total tread depth.

The contour of the tread, as best illustrated in FIG. 2 is an approximation to a portion of a logarithmic spiral from the equatorial plane of the tire to its shoulder. The ratio of the radius at the shoulder to the radius at the centerline is 0.28 to 0.48, preferably about 0.38. It is believed that this contour of the tread causes a more even distribution of weight in the footprint of the tire which theoretically improves traction and wear properties.

Figure 4:
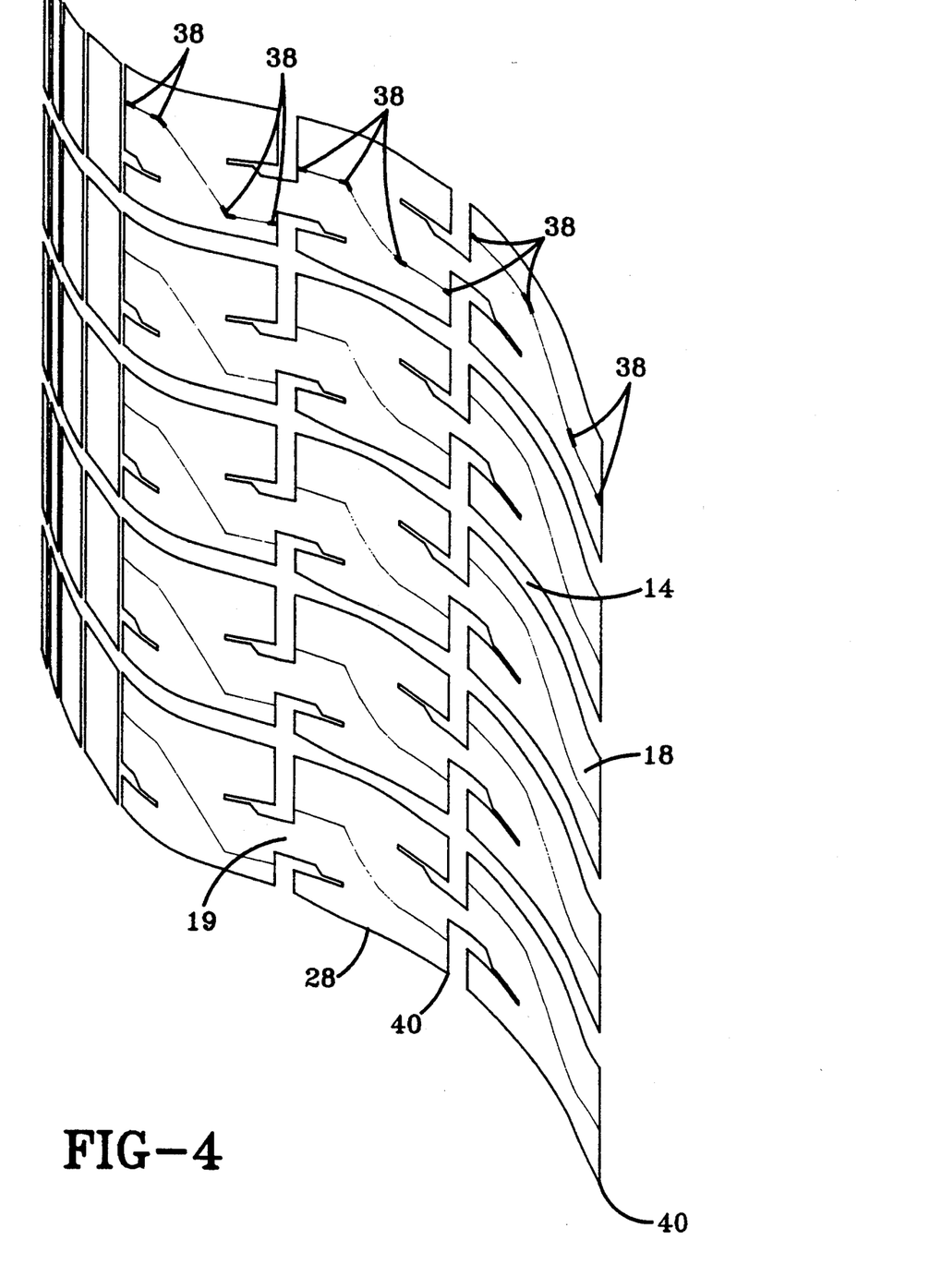
FIG. 4 illustrates a portion of the tread pattern of the tire showing the curved pitch.

With reference now to FIG. 4, it can be seen that the curved lateral groove 14 causes a natural shift between each lug 18 along a lateral groove. That is, the lugs are not lined up laterally. Since lugs 18 are slightly shifted relative to one another, the lugs enter the footprint during rotation of the tire at different times, and since it is believed that the entry and exit of a lug from a footprint is the primary cause of tire noise, it is believed that noise is dispersed.

It can also be seen that the curvature of the lateral grooves corresponds to a curvature in the shape of the leading and trailing edges of lugs 18. Accordingly, when a lug 18 enters a footprint as the tire rotates, a relatively small edge or point 40 enters the footprint first, leading the way for the larger land area of the center of the lug. It is believed that the shape of the lug further reduces noise and irregular wear because the lug is eased or pried into the footprint by the small leading edge. The curved leading edges 28 of the lugs reduce or spread out the contact impact of the lug by its transitional loading.

It is believed that the noise of the tire can be further reduced by using a tread compound that undergoes a small amount of distortion or is slow to react or rebound either because of its stiffness or because of its relatively high hysteresis, which also reduces acceleration of a lug as it comes out of the footprint. Preferably, such a tread compound will retain good traction properties.

A preferred tread compound used in the tire is an SIBR rubber of the type as described in copending U.S. patent application Ser. No. 07/363,811, filed Jun. 9, 1989, now abandoned, and Ser. No. 07/213,019 filed Jun. 29, 1988 now U.S. Pat. No. 5,047,483, issued Sep. 10, 1991, incorporated herein by reference.

Figure 5:
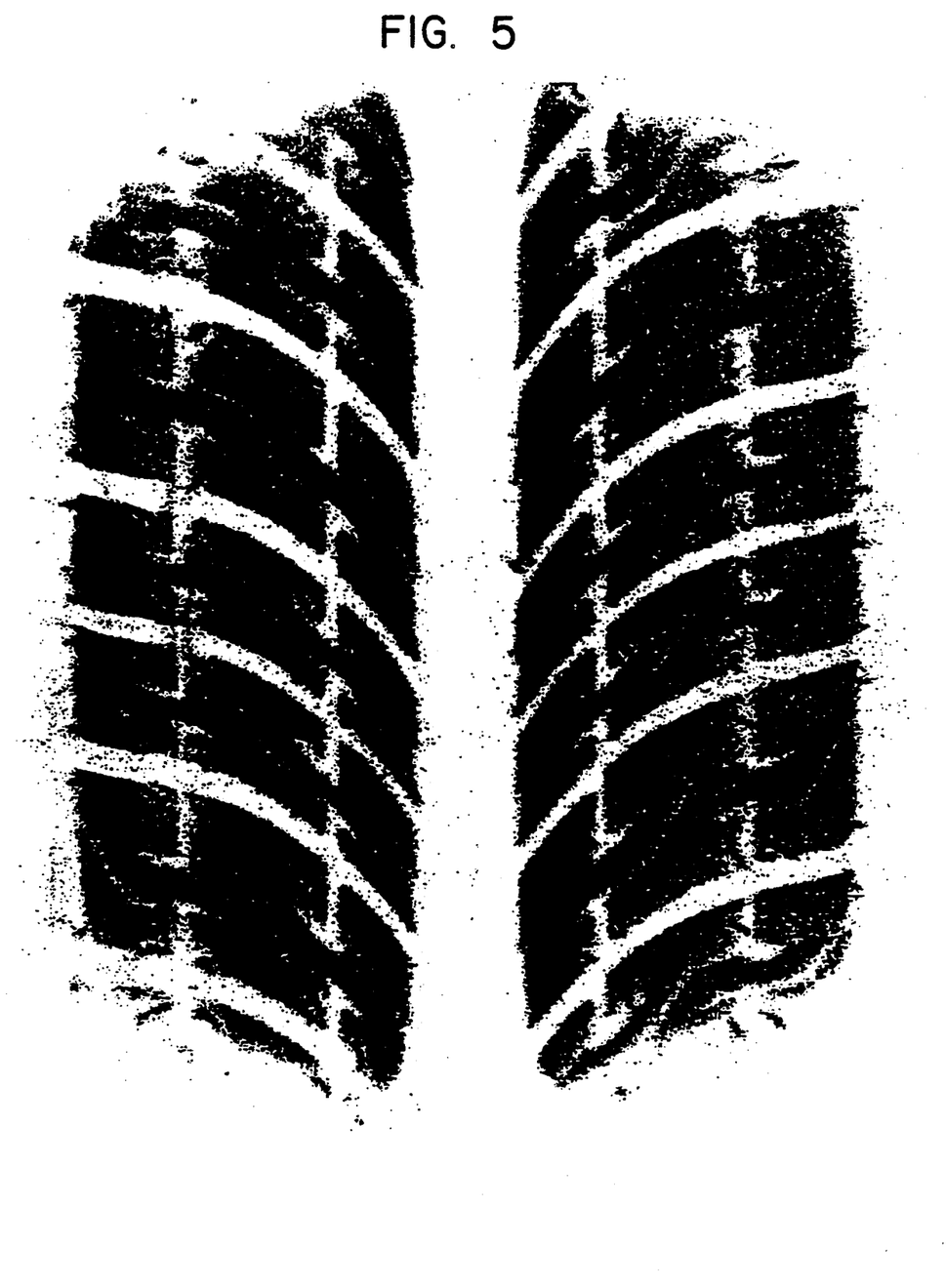
FIG. 5 illustrates a footprint produced by the tire illustrated in FIG. 1.

With reference now to FIG. 5, a footprint of the tire illustrated in FIG. 1 shows an overall oval shape which is typical of most well made passenger tires. The footprint comprises two base to base trapezoidally shaped contact patches. There is no collapse in the leading and trailing parts of the footprint as is typical of many prior art tires having a wide center groove. Those skilled in the art will recognize that trapezoidal shaped footprint patches that have less obtuse angles and approach the shape of a rectangle may also be desirable, and the invention is not limited by the embodiment shown.

Since the carcass and belt of the tire are conventional and are the same as those used in Eagle ® GT+4 Tires and comprise 2 polyester carcass plies and 2 steel belts it is believed that the stability of the footprint, despite the wide aqua-channel, is due in part to lateral stability provided by the curved grooves in the tread. The shape of the tread lugs causes each lug to interact with a large number of radial carcass cords (contact force is spread over a large area). In the illustrated embodiment, the shape of the lugs causes each lug to interact with about 1½ to 2½ times as many radial reinforcement cords as and non curved lug of similar size. In the tread design where bridges 19 are used, bridges 19 further enhance the lateral stability of the tire.

Surprisingly, it has been found that when the tires of the invention are mounted backwards (i.e. with the tread design directionally opposite to the direction which provides optimum wet traction), superior performance in snow is achieved. It is believed that superior traction in snow is obtained for the same reasons that superior wet braking is achieved, i. e. the low trailing groove wall angle and the curved tread design give the tire superior biting properties.

The invention is further illustrated with reference to the following examples.

EXAMPLE 1

This example compares wet and dry slide properties of a tire of the invention (A) and a similar tire made without an aqua channel (B) to a commercially available rain tire (Uniroyal Tigerpaw ™) as a control. The results are normalized to control equal 100.

| | | | Results | | | | | |
|---|---|---|---|---|---|---|---|---|
| | Wet 20 | | Wet 40 | | Wet 60 | | Dry 40 | |
| Const | Peak | Slide | Peak | Slide | Peak | Slide | Peak | Slide |
| Control | 100 | 100 | 100 | 100 | 100 | 100 | 100 | 100 |
| A | 124+ | 123+ | 132+ | 111+ | 125+ | 101= | 106+ | 111+ |
| B | 113+ | 112+ | 123+ | 97− | 119+ | 78− | 105+ | 107+ |

Note:
+ means better than the control within a 95% confidence level
= means equal to the control within a 95% confidence level
− means worse than the control within a 95% confidence level All tests were made on an asphalt surface. The results under the heading Wet 20 indicates the normalized length of the slide when full braking was initiated at 44 kph (28 mph) on a wet asphalt surface. The headings of the other tests are similarly descriptive.

For wet traction, the aquachannel appears to have a significant effect. The average peak and slide ratings were 11 to 12% higher with the aquachannel than without. The aquachannel appears to have little effect on dry traction.

The aquachannel used in this test was the narrower, shallower design illustrated in FIG. 1. The lateral and annular grooves had the configuration illustrated in FIG. 2.

EXAMPLE 2

This example illustrates a snow handling test. This test measures the "g"s encountered during acceleration, deceleration (on braking), and cornering. Measurements were made using instruments or were calculated from the data obtained. The control is an Invicta GS tire, #2 is a tire of the invention made using an SIBR rubber tread compound, #3 is a tire of the invention made using the same tread rubber as the control which was mounted backwards, #4 is the same tire as #3 mounted in the intended direction, and #5 is a Michelin XA4 tire. All tires were size P205/70R14.

| | Control | #2 | #3 | #4 | #5 |
|---|---|---|---|---|---|
| Acceleration | .17 | .17 | .17 | .15 | .15 |
| Deceleration | .42 | .42 | .39 | .40 | .39 |
| Cornering | .28 | .28 | .28 | .26 | .28 |

A difference of 0.02 is the detectable limit of the test. Higher numbers show better results. The data indicates that, for these parameters, the tire of the invention is at least equivalent to all season tires now in use.

The same tires were evaluated subjectively in a packed snow handling test with the following results.

| SUBJECTIVE PACKED SNOW HANDLING | | | | | |
|---|---|---|---|---|---|
| AMBIENT TEMP: 0-6 SUFRACE TEMP: 5-9 | DATE: 1-30-91 | | DRIVER: Neale | | |
| | Control | #2 | #3 | #4 | #5 |
| ACCEL: TRACTION | 5 | 5 | 5 | 4.5 | 4.5 |
| ACCEL: YAW STABILITY | 5 | 5 | 4.5 | 5 | 4 |
| ACCEL: 0-50 m TIME-SECONDS | 7.95 | 7.92 | 8.06 | 8.41 | 8.34 |
| STANDARD DEV. | 7.94 | | | | |
| BRAKE: TRACTION | 5 | 5 | 4.5 | 4.5 | 4.5 |
| LAT. TRACTION FRONT | 5 | 5 | 5 | 4 | 5 |
| LAT. TRACTION REAR | 5 | 5 | 5.5 | 4 | 5.5 |
| Control | Good straight line, slow front response then rear slide | | | | |
| Set 2 | Similar to Control | | | | |
| Set 3 | Initial turn-in good, little rear slide, good balance. | | | | |
| Set 4 | Followed ruts, slow to turn-in, then rear slide, less trip. | | | | |
| Set 5 | Mich . . . Good lat grip, good overall balance, good turn in. | | | | |

In the subjective packed snow handling, the driver rated the performance of each tire subjectively. Higher numbers in the subjective ratings indicate better results.

EXAMPLE 3

In a different size (as compared to Example 2), the "g" measurements and subjective snow handling tests were repeated comparing an Arriva tire as a control (size P185/70R13), (#2) Corsa GT as a second control, (#3) the tire of the invention, and (#4) a Michelin X4A. As in example 2, "g"s were measured, and the driver provided his subjective conclusions.

| | Control | #2 | #3 | #4 |
|---|---|---|---|---|
| Acceleratin | .17 | .15 | .14 | .13 |
| Deceleration | .42 | .39 | .40 | .39 |
| Cornering | .29 | .30 | .25 | .27 |

General Test Details

1. Wheels 5×13
2. 29 psi inflation
3. Vehicle: Corolla

The acceleration, deceleration and cornering data, as measured by the instruments, seems to indicate that, except that Arriva was measurably better than the Michelin XA4, the four tires had comparable properties.

The subjective rating given by the driver is tabulated below, along with the driver's comments.

| SUBJECTIVE PACKED SNOW HANDLING - T74 | | | | |
|---|---|---|---|---|
| AMBIENT TEMP: 18-20 SURFACE TEMP 16-18 | DATE: 1-27-91 | | Driver: Neale | |
| | Control | #2 | #3 | #4 |
| ACCEL: Traction | 5 | 4.5 | 4 | 4 |
| ACCEL: YAW STABILITY | 5 | 4 | 4.5 | 4 |
| ACCEL: 0-50 m TIME-SECONDS | 7.78 7.78 | 8.47 | 8.78 | 8.83 |
| BRAKE: TRACTION | 5 | 5 | 5 | 5 |
| LAT. TRACTION: FRONT | 5 | 4.5 | 4 | 4.5 |
| LAT. TRACTION REAR | 5 | 4.5 | 4 | 4.5 |
| Control | Good balance, slt o.s. | | | |
| Set #2 | Push, then rear slide, followed ruts | | | |

| SUBJECTIVE PACKED SNOW HANDLING - T74 | |
|---|---|
| Set #3 | Less lat grip, straight line down slightly but didn't follow ruts as badly as Set #2 |
| Set #4 | Like Control but less grip, poor on following ruts |

In the subjective ratings, the higher numbers indicate the best results.

The Arriva had a good balance between straight line and lateral grip. The Corsa GT, while generating good lateral readings on the G-Analyst, understeered for the first third of the turn, then proceeded to oversteer around the rest of the turn. The tire of the invention just lacked lateral grip and usually finished the turn in a four wheel slide. The Michelin also had a good balance of traction, just at a lower limit than the Arriva.

EXAMPLE 4

Tires of the invention, along with a set of Invicta GS controls and Michelin XA4 tires, were tested for wet handling.

In the test, an Invicta GS was used as a control, a tire of the invention made without bridges between lugs was set #2, a tire of the invention made using bridges laterally between lugs was set #3, and a Michelin XA4 was set #4.

| WET HANDLING - FRONT WHEEL & 4 WHEEL DRIVE DRIVER: STOLL | | | | |
|---|---|---|---|---|
| | CONTROL | #2 | #3 | #4 |
| AVG LAP TIME | 57.93 | 56.64 | 56.37 | 58.62 |
| S.D. | .19 | .08 | .03 | .14 |
| Circle Lat Gs | .669 | .690 | .700 | .642 |
| S.D. | .003 | .004 | .003 | .001 |
| STRAIGHT LINE HYDROPLANING | 5 | 5.5 | 5.5 | 4.5 |
| LATERAL HYDROPLANING | 5 | 5.5 | 5.5 | 4.5 |
| STEERING RESPONSE | 5 | 5.5 | 6 | 4.5 |
| OVERSTEER | 5 | 5 | 5.5 | 4.5 |
| OFF THROTTLE OVERSTEER | 5 | 5 | 5.5 | 4.5 |
| TRACTION TRANSITION | 5 | 5 | 5.5 | 4 |
| LATERAL GRIP | 5 | 6 | 5.5 | 4.5 |
| BRAKING TRACTION | 5 | 7 | 6.5 | 5.5 |
| ACCELERATION TRACTION | 5 | 6 | 5.5 | 4.5 |

General Test Details
1. Wheels 5.5X14JJ stamped steel.
2. Inflation: 35 psi, F&R.
3. Load: Driver.
4. Vehicle Characteristics: Stock, aligned to OE specs.

Comments

Set 1. (Control) Lots of off-throttle oversteer. Car gets real squirrely in transients. Poor F/R balance in braking—lots of rear bias. Also, lots of understeer while powering out of corners.

Set 2. Braking grip is phenomenal compared to last set...quantum-leap improvement. Tires have more stopping power than car has brakes. Also, very good grip in cornering+acceleration. Tires feel like they have much better road contact.

Set 3. Most precise steering of all sets. Very good braking. Excellent controllability in transients, minimal O/S, good acc. grip in powering out of corners, good cornering grip.

Set 4. Tires are just slippery all over. Not predictable or smooth. Car pushes a lot under power, but rear gets real loose in transients off-throttle. Not great braking...-only marginally better than controls.

Conclusions

Sets 2 and 3 were the best overall. Set 2 had braking, cornering, and acceleration grip that was far superior to the controls; it was also better than any of the sets as well. Set 3 had wet grip that was nearly equal to that of set 2, and was actually superior to set 2 for oversteer parameters. Set 3 also had a steering feel that was more precise and responsive than any other set. Further, set 3 was the fastest set tested, on both the 200' circle as well as the handling course itself. It was a very easy set to drive fast in the wet.

While specific embodiments of the invention have been illustrated and described, it will be recognized by those skilled in the art that the invention may be variously modified and practiced without departing from the spirit of the invention. The invention is limited only by the following claims.

What is claimed is:

1. A pneumatic automobile tire for high speed use on paved surfaces having a footprint net-to-gross ratio of 50% to 80% and an aspect ratio of 0.35 to 0.80 which has a directional read divided into two annular portions, each said annular portion comprising a plurality of block elements separated by lateral grooves, said block elements extending continuously from a shoulder area of the tire to a midportion of the tread, wherein said block elements have substantially circumferentially aligned notches in leading and trailing lateral groove walls, each said substantially circumferentially aligned notch being defined laterally by a narrow bridge of rubber in said block element, said substantially circumferentially aligned notches and lateral grooves defining lugs, and wherein slots containing tie bars are present in each lug, said slots and substantially circumferentially aligned notches permitting limited independent movement of lugs.

2. The pneumatic automobile tire of claim 1 comprising a pair of annular beads, carcass plies wrapped around said annular beads, said tread disposed over said carcass plies in a crown area of said tire, and sidewalls disposed between said tread and said beads, wherein said tread has a footprint net-to-gross ratio of 50% to 70% and at least one annular aqua channel having a width of about 10% to 20% of total treadwidth based on the footprint of the tire and a depth of 78% to 100% of total tread depth, and wherein said lateral grooves comprise at least a portion of an S-shape having a leading end initiating within said annular aqua channel and a trailing end terminating in a shoulder area of said tire.

3. The pneumatic tire of claim 2 in which said aqua channel has curved walls wherein adjacent lugs are contoured into said aqua channel forming a curvate U-shape.

4. The pneumatic tire of claim 2 in which said lugs have a leading lateral groove wall having an open angle of 3° to 8° and a trailing lateral groove wall having an open angle of about 0° to 2°.

5. The pneumatic tire of claim 4 in which said leading edge groove wall has an open angle of about 5° and said trailing edge groove wall has an open angle of about 1°.

6. The pneumatic tire of claim 2 in which said lateral grooves on each side of said annular aqua channel are disposed to have a pitch boundary shift therebetween.

7. The pneumatic tire of claim 6 in which said boundary shift comprises ½ medium pitch.

8. The pneumatic tire of claim 2 in which said aqua channel is centered at 10% to 50% of said treadwidth.

9. The pneumatic tire of claim 2 wherein said lateral grooves extend through said shoulder and terminate in the proximity of said sidewall.

10. The pneumatic tire of claim 2 in which said aqua channel width is about 15% of said tread width.

11. The pneumatic tire of claim 2 in which said aqua channel depth is 82% to 92% of said tread depth.

12. The pneumatic tire of claim 2 wherein said lateral grooves comprise a full S-shape initiated in said aqua channel and terminating in said shoulder area in the proximity of said sidewall.

13. The pneumatic tire of claim 2 in which said carcass plies comprise at least one high turnup ply and at least one low turnup ply.

14. The pneumatic tire of claim 2 which has a footprint net-to-gross ratio in a ground contacting part of the tread is 65% to 75% and has a footprint net-to-gross ratio of about 55% to 65%.

15. The pneumatic tire of claim 2 in which said lugs have a rounded leading edge.

16. The pneumatic tire of claim 2 in which said tread, shoulder to equatorial plane has the shape of a logarithmic spiral wherein the radius of the tire at the shoulder area is less than the radius of the tire at the center.

17. The tire of claim 1 wherein said tread comprises SIBR rubber.

18. A pneumatic automobile tire for high speed use on paved surfaces having a footprint net-to-gross ratio of 50% to 80% and an aspect ratio of 0.35 to 0.80 which has a directional tread divided into two annular portions, each said annular portion comprising a plurality of block elements separated by lateral grooves, said block elements extending continuously from a shoulder area of the tire to a midportion of the tread, said block elements having substantially circumferentially aligned notches in leading and trailing lateral groove walls, each said substantially circumferentially aligned notch being defined laterally by a narrow bridge of rubber in said block element, said substantially circumferentially aligned notches and lateral grooves defining lugs, wherein slots containing tie bars are present in each lug, said slots and substantially circumferentially aligned notches permitting limited independent movement of lugs, and wherein said tire has at least one annular aqua channel having a width of about 10% to 20% of total tread width based on the footprint of the tire and a depth of 78% to 100% of total tread depth, said aqua channel having curved walls wherein adjacent lugs are contoured into said aqua channel forming a curvate U-shape, and wherein said lugs have a leading lateral groove wall having an open angle of 3° to 8° and a trailing lateral groove wall having an open angle of about 0° to 2°.

* * * * *